United States Patent [19]
Thiel

[11] Patent Number: 6,142,579
[45] Date of Patent: Nov. 7, 2000

[54] CORROSION PROTECTION CAP FOR POLYGONAL NUTS

[75] Inventor: Horst Thiel, Herscheid, Germany

[73] Assignee: RADOLID Thiel GmbH, Ludenscheid, Germany

[21] Appl. No.: 09/310,058

[22] Filed: May 11, 1999

[30] Foreign Application Priority Data

May 27, 1998 [DE] Germany ............................ 198 23 624

[51] Int. Cl.$^7$ ....................................................... B60B 7/12
[52] U.S. Cl. ..................................... 301/37.37; 301/108.4; 411/431
[58] Field of Search ................................. 301/35.62, 37.1, 301/37.37, 37.42, 108.4; 411/371, 373, 427, 428, 429, 430, 431, 377

[56] References Cited

U.S. PATENT DOCUMENTS

| | | | |
|---|---|---|---|
| 4,582,462 | 4/1986 | Thiel | 411/371 |
| 5,028,093 | 7/1991 | Nason | 301/35.62 |
| 5,048,898 | 9/1991 | Russell | 301/37.37 |
| 5,163,797 | 11/1992 | Patti | 411/431 |
| 5,707,113 | 1/1998 | Russell | 301/37.37 |
| 5,810,532 | 9/1998 | Huang | 411/431 |

FOREIGN PATENT DOCUMENTS

3335723  4/1985  Germany ................ 411/371

*Primary Examiner*—Russell D. Stormer
*Attorney, Agent, or Firm*—Edwin D. Schindler

[57] ABSTRACT

A corrosion protection cap for clamping onto a polygonal wheel nut, having a cylindrical casing which engages over the polygonal wheel nut, and having groove profiles formed in the web of a spring ring, which are open toward the casing axis and of which the vertices in each case correspond to the corners of the polygonal nut profile and the distance of the vertices from the casing axis is slightly less than the radial distance of each corner of the polygonal nut profile from the casing axis. The technical problem is a corrosion protection cap which can be clamped and detached virtually effortlessly by manual actuation and which moreover has a high pull-off force. The spring ring (10) seated in the cylindrical casing (2) has radially inwardly protruding webs (14) with said groove profiles, and the webs (14) are inclined in the radial direction toward the top wall (5) of the corrosion protection cap (1).

12 Claims, 1 Drawing Sheet

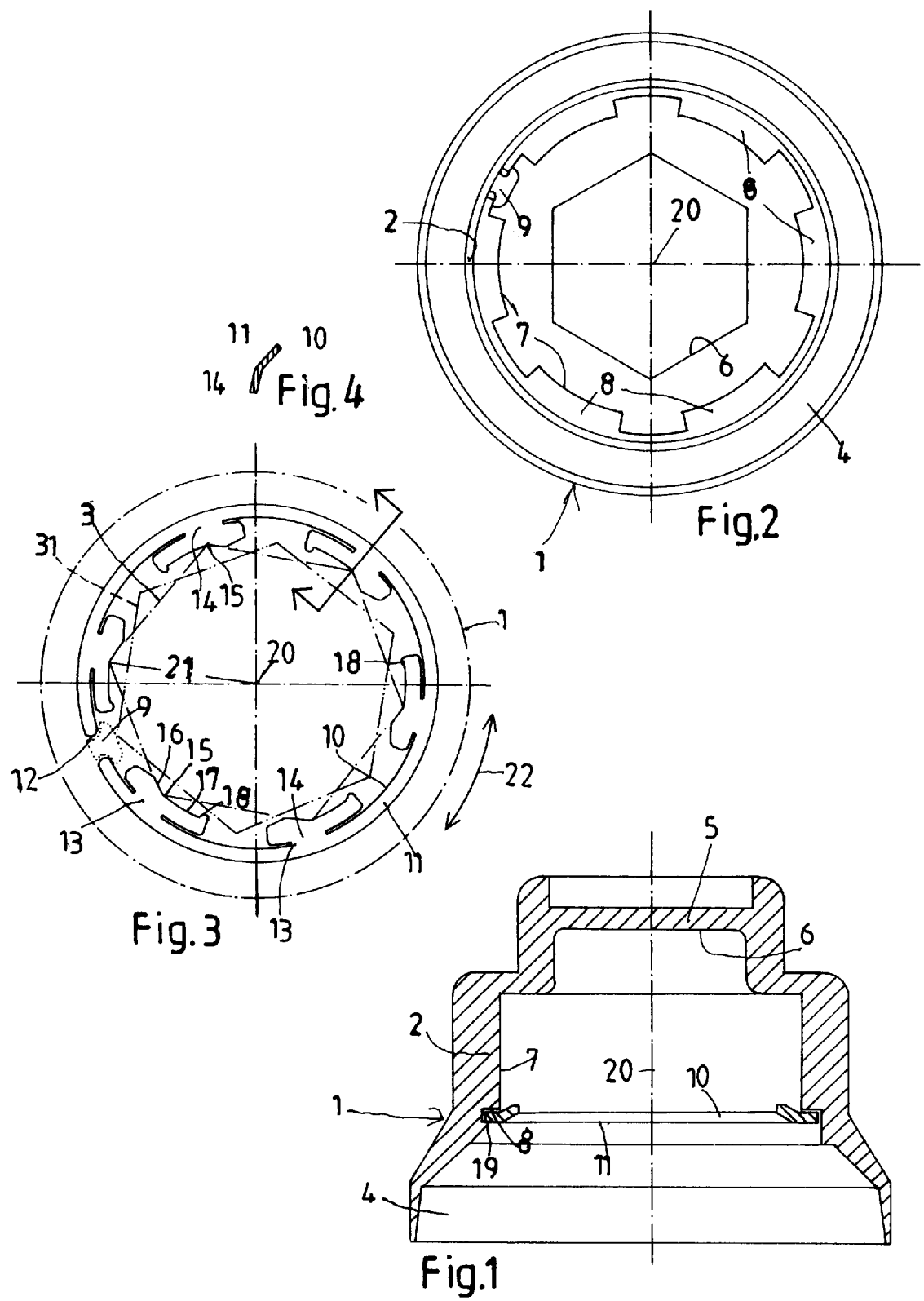

CORROSION PROTECTION CAP FOR POLYGONAL NUTS

BACKGROUND OF THE INVENTION

1. Field of the Invention

The invention relates to a corrosion protection cap for clamping onto a polygonal wheel nut, having a cylindrical casing which engages over the polygonal wheel nut, and having groove profiles formed in the web of a spring ring, which are open toward the casing axis and of which the vertices in each case correspond to the corners of the polygonal nut profile and the distance of the vertices from the casing axis is slightly less than the radial distance of each corner of the polygonal nut profile from the casing axis.

Such a corrosion protection cap is a thermoplastic injection moulded part which clampingly engages over the polygonal wheel nut and sealingly bears against a washer or the hub. The polygonal nut is normally a hexagon nut.

2. Description of the Prior Art

DE 33 35 723 C2 describes a corrosion protection cap of the generic type in which the groove profiles are constructed in axial webs integrally with the cylindrical casing. As the cap is being firmly clamped by rotation, the groove profiles are pressed onto the corners of the polygonal nut profile, producing a high surface pressure. This results in a high pull-off force in the axial direction, so that the corrosion protection cap is nondetachably seated on the polygonal wheel nut. However, the clamping force and the detaching force for the corrosion protection cap are also so great that manipulation is possible only using a wrench or similar tool. The manipulability of the corrosion protection cap is thereby diminished.

SUMMARY OF THE INVENTION

The object of the invention is a corrosion protection cap which can be clamped and detached virtually effortlessly by manual actuation and which moreover has a high pull-off force.

This object is achieved according to the invention in that a spring ring seated in the cylindrical casing has radially inwardly protruding webs with said groove profiles and in that the webs are inclined in the radial direction toward the top wall of the corrosion protection cap.

The invention differs from the prior art in that, as the corrosion protection cap is being clamped onto the polygonal wheel nut by rotation, the inclined webs are wedged in the manner of barbs against the outer profile or outer wall of said nut. On pulling off in the axial direction, the pull-off force produces, by way of the inclined webs, a pressure force acting in the radial direction and hence a rising retaining force, since the webs are clamped by a reduction of the inclination. It is thus impossible to pull off the corrosion protection cap axially. In contrast, it is possible effortlessly to clamp and detach the corrosion protection cap by rotation, since there is no load or stress acting on the webs in the radial direction upon rotation. Manipulation is easily possible with one hand even at places having poor accessibility.

A favorable transformation of the pull-off force into a retaining force is achieved in that the webs are inclined at an angle of between 5 and 20°, preferably of between 10 and 15°, particularly preferably of about 12°.

A secure support of the spring ring is guaranteed in that an annular surface is constructed in the inner wall of the cylindrical casing as a bearing surface for an annular strip of the spring ring.

A stable support of the spring ring in the region of the webs is achieved in that the annular surface is constructed as a segmented annular surface by means of end steps of axial webs.

The spring ring is fixed in the circumferential direction in that a stop is provided in the region of the annular surface and in that the annular strip has a radial gap, the edges of which bear against the sides of the stop.

The spring ring is secured against sliding out in the axial direction in that the annular surface faces an undercut border which overlaps the outer edge of the annular strip. The spring ring can be inserted like a snap ring into the annular groove formed by the annular surface and the undercut border.

An effortless insertion of the spring ring by placing it onto the annular surface is made possible in that the undercut border is constructed as a deformation bead. After the spring ring has been placed onto the annular surface, the deformation bead is formed by plastic deformation of the thermoplastic material, for example by means of ultrasonic welding, so that the annular strip is enclosed in the U-shaped gap between the annular surface and the deformation bead.

The elastic deformation and clamping of the webs is facilitated in that each web is connected to the annular strip in the region of the vertex by means of a neck portion.

An exact-fitting contact of the spring ring against the polygonal wheel nut is ensured in that each web has, adjoining the vertex, on one side, a first straight groove edge which includes an angle equal to half the corner angle of the polygonal profile with the radial line connecting the vertex to the axis of the cylindrical casing. This straight edge is thus laid against an outer surface of the polygonal wheel nut.

The tightening and loosening by rotation is facilitated in that each web has, adjoining the vertex, on the other side, a curved edge which is concentric with the casing axis and the radius of which corresponds to the distance of the vertex of each corner of the polygonal nut profile from the casing axis.

To facilitate the clamping and for the sensing of the clamping function, it is proposed that a radially inwardly projecting nose is constructed at the end of the curved edge.

BRIEF DESCRIPTION OF THE DRAWING

An exemplary embodiment of the invention is explained with reference to the drawing in which:

FIG. 1 shows a corrosion protection cap in section,

FIG. 2 shows a bottom view of FIG. 1,

FIG. 3 shows an detail view of the spring ring with schematic corrosion protection cap and FIG. 4 shows a section on the line IV—IV in FIG. 3 on an enlarged scale.

DESCRIPTION OF THE PREFERRED EMBODIMENT

The exemplary embodiment of the invention explained below relates to a corrosion protection cap for a hexagon wheel nut. The construction of the profile grooves and the webs for polygonal wheel nuts with a different number of corners depends merely on the number of corners of the polygonal wheel nut. The exemplary embodiment described is intended for clamping by right-hand rotation and detaching by left-hand rotation. For other directions of rotation, the webs and profile grooves have to be constructed mirror-symmetrically.

A corrosion protection cap 1 comprises a cylindrical casing 2 which engages over a hexagon wheel nut 3, indicated by a dash-dot line in FIG. 3, a sealing cone border 4 at the bottom and a hat-shaped chamber 6 with a terminating top wall 5. A protruding end of a threaded pin of the wheel bolted connection is received in the hat-shaped chamber 6, but this is not shown. Six axial webs 7, the end faces of which define a plane segmented annular surface 8, are arranged on the inside of the cylindrical casing 2. A radial stop 9 is constructed to protrude in the axial direction with respect to the annular surface 8.

The annular surface 8 is a bearing surface for a spring ring 10. The spring ring 10 consists of an outer circumferential open or split annular strip 11 which rests on the annular surface 8 and the ends of which delimit a gap 12. Seated on the annular strip 11 on six radial neck portions 13 are six webs 14 which are oriented in the circumferential direction and arranged at equal angular distances of 60° in the circumferential direction. The webs 14 are inclined at an angle of 5 to 20°, preferably 10 to 15°, very particularly preferably at an angle of 12°, in the radial direction toward the top wall 5.

The inner edge of each web 14 has a groove profile, the vertex 15 of which is at a vertex distance from the casing axis 20 of the cylindrical casing 2 on a radial line 21 which is slightly less than the distance of a corner of the hexagon wheel nut profile from the casing axis 20 of the cylindrical casing 2.

The first groove edge 16, pointing in the clockwise direction from the vertex 15 referring to FIG. 3, has a straight course and includes an angle equal to half the corner angle of the hexagon profile, i.e. an angle of 60°, with the radial line 21 connecting the vertex 15 to the casing axis 20 of the cylindrical casing 2. This groove edge thus runs parallel to an edge of the hexagon wheel nut profile. The second channel edge is a curved edge 17 which forms, concentrically with the casing axis 20 of the cylindrical casing 2, a circular arc, the radius of which corresponds to the distance of the vertex of each corner of the hexagon wheel nut profile from the casing axis. An inwardly projecting nose 18 is constructed at the end of each curved edge 17.

For assembly, the spring ring 10 is placed onto the annular surface 8 with the ends of the annular strip 11 bearing against the stop 9 from both sides and thus fixing the spring ring 10 in the circumferential direction. The adjoining inner wall is made to flow by heating and deformed into a bead or undercut border 19, so that the annular strip 11 of the spring ring 10 lies in a U-shaped circumferential groove. The corrosion protection cap is now ready for use and mounting.

For mounting onto a hexagon wheel nut, the corrosion protection cap 1 is slipped onto the hexagon wheel nut 31 in the circumferential position depicted, FIG. 3 showing a view when looking into the sealing cone border. The corrosion protection cap can be pushed effortlessly onto the hexagon wheel nut in this orientation, because there is no contact with the circumferential wall of the hexagon wheel nut.

By right-hand rotation, i.e. in the representation of FIG. 3, by rotation in the counterclockwise direction, the corrosion protection cap 1 is firmly clamped on the hexagon wheel nut 3. In the process, first of all the noses 18 of the groove profiles meet the corners of the hexagon wheel nut 31. The webs 14 are additionally inclined in the process. The further rotation takes place by way of the curved edges 17, until the straight edges 16 bear against the associated circumferential surface of the hexagon wheel nut 3, whereby a limitation of the rotation takes place.

On attempting to pull off the corrosion protection cap in the axial direction, the webs 14 become increasingly wedged between the cylindrical casing and the hexagon wheel nut, so that an increasing retaining force is dynamically built up. This prevents the corrosion protection cap from being pulled off axially.

To detach the corrosion protection cap, a left-hand rotation is effected. This is readily possibly by hand. The corrosion protection cap is again rotated into the position relative to the hexagon wheel nut 31 and can now be pulled off in a manner free from contact.

I claim the following:

1. A corrosion protection cap for clamping onto a polygonal wheel nut, comprising:
a cylindrical casing engaging over a polygonal wheel nut;
a top wall; and,
a spring ring seated in said cylindrical casing having radially inwardly protruding webs with groove profiles, said groove profiles being open toward an axis of said cylindrical casing and of which vertices in each case correspond to corners of a profile of the polygonal wheel nut, with the distance of the vertices from the axis of said cylindrical casing being slightly less than a radial distance of each said corner of the profile of the polygonal wheel nut from the axis of said cylindrical casing, said radially inwardly protruding webs being inclined in a radial direction toward said top wall of said corrosion protection cap.

2. The corrosion protection cap according to claim 1, wherein said radially inwardly protruding webs are inclined in the radial direction at an angle of between 5° and 20°.

3. The corrosion protection cap according to claim 2, wherein said radially inwardly protruding webs are inclined in the radial direction at an angle of between 10° and 15°.

4. The corrosion protection cap according to claim 3, wherein said radially inwardly protruding webs are inclined in the radial direction at an angle of approximately 12°.

5. The corrosion protection cap according to claim 1, wherein said cylindrical casing has an inner wall with an annular surface and said spring ring includes an annular strip imbedded on said annular surface of said inner wall of said cylindrical casing, said annular surface being constructed in said inner wall as a bearing surface for said annular strip of said spring ring.

6. The corrosion protection cap according to claim 5, further comprising a plurality of axial webs having end faces and being arranged inside of said cylindrical casing, said annular surface being segmented with said end faces of said plurality of axial webs defining thereby a segmented annular surface.

7. The corrosion protection cap according to claim 5, further comprising a stop proximate of said annular surface, wherein said annular strip of said spring ring has a radial gap, edges of which bear against sides of said stop.

8. The corrosion protection cap according to claim 7, further comprising an undercut border overlapping an outer edge of said annular strip, with said annular surface facing said undercut border, so that said undercut border and said annular surface of said inner wall of said cylindrical casing provide a U-shaped circumferential groove.

9. The corrosion protection cap according to claim 8, wherein said undercut border is constructed as a deformation head.

10. The corrosion protection cap according to claim 1, wherein said cylindrical casing has an inner wall with an annular surface and said spring ring includes an annular strip imbedded on said annular surface of said inner wall of said cylindrical casing, wherein each of said radially inwardly protruding webs is connected to said annular strip proximate a vertex via a neck portion.

11. The corrosion protection cap according to claim 1, wherein each of said radially inwardly protruding webs has, adjoining a vertex, on a first side, a first straight groove edge, which comprises an angle equal to half a corner angle of the profile of the polygonal wheel nut with a radial line connecting the vertex to the axis of said cylindrical casing, and, on a second side, a curved edge being concentric with the axis of said cylindrical casing and a radius of which corresponds to a distance of the vertex of each said corner of the profile of the polygonal wheel nut from the axis of said cylindrical casing.

12. The corrosion protection cap according to claim 11, further comprising a radially inwardly projecting nose constructed at an end of said curved edge.

\* \* \* \* \*